(12) United States Patent
Wear et al.

(10) Patent No.: US 8,290,304 B2
(45) Date of Patent: Oct. 16, 2012

(54) ITERATIVE REGION-BASED AUTOMATED CONTROL POINT GENERATION

(75) Inventors: Mark E. Wear, Greensboro, NC (US); Steven S. Perkins, Arlington, TX (US); Jared J. Lance, Oak Ridge, NC (US)

(73) Assignee: Lockheed Martin Corporation, Bethesda, MD (US)

(*) Notice: Subject to any disclaimer, the term of this patent is extended or adjusted under 35 U.S.C. 154(b) by 1182 days.

(21) Appl. No.: 12/035,146

(22) Filed: Feb. 21, 2008

(65) Prior Publication Data
US 2008/0205790 A1   Aug. 28, 2008

Related U.S. Application Data

(60) Provisional application No. 60/891,344, filed on Feb. 23, 2007.

(51) Int. Cl.
*G06K 9/32* (2006.01)
*G09G 5/00* (2006.01)

(52) U.S. Cl. .................. 382/294; 345/677

(58) Field of Classification Search .......... 382/190, 382/195, 199, 201, 299, 284, 276, 294, 305, 382/312; 345/645, 677; 375/240.18, 254
See application file for complete search history.

(56) References Cited

U.S. PATENT DOCUMENTS

| | | | |
|---|---|---|---|
| 6,553,152 B1* | 4/2003 | Miller et al. | 382/294 |
| 6,694,064 B1 | 2/2004 | Benkelman | 382/284 |
| 7,394,946 B2* | 7/2008 | Dewaele | 382/276 |
| 7,397,934 B2* | 7/2008 | Bloch et al. | 382/128 |
| 7,961,982 B2* | 6/2011 | Sibiryakov et al. | 382/294 |
| 2005/0078880 A1 | 4/2005 | Schroeder | 382/294 |

OTHER PUBLICATIONS

Invitation to Pay Additional Fees and, where applicable, Protest Fee and Communication relating to the results of the Partial International Search mailed Apr. 14, 2009.
XP-002522119, Goshtasby, A., "*Piecewise Linear Mapping Functions for Image Registration*", (1986) Pattern Recognition, vol. 19, No. 6, pp. 459-466.
XP-002522120, Zitova, B., Flusser, J., *Image Registration Methods: A Survey*, (2003) Image and Vision Computing 2, pp. 977-1000.

* cited by examiner

*Primary Examiner* — Kanjibhai Patel
(74) *Attorney, Agent, or Firm* — Lee, Jorgensen, Pyle & Kewalramani, P.C.

(57) ABSTRACT

The present invention presents a technique for use in registering two images. In a first aspect, the invention includes a computer-implemented method for use in registering a first image to a second image, comprising: generating a base transform between the first and second image; generating a plurality of candidate control points from the first and second images; generating a plurality of meshed regions from the base control points and the actual control points from which the first image may be mapped to the second image. In other aspects, the includes a program storage medium encoded with instructions that, when executed by a computing device, will perform the method; a computing apparatus programmed to perform the method; a data product produced by the method; a program storage medium encoded with a data product produced by the method; and a computing apparatus on which resides a data product produced by the above method.

12 Claims, 9 Drawing Sheets

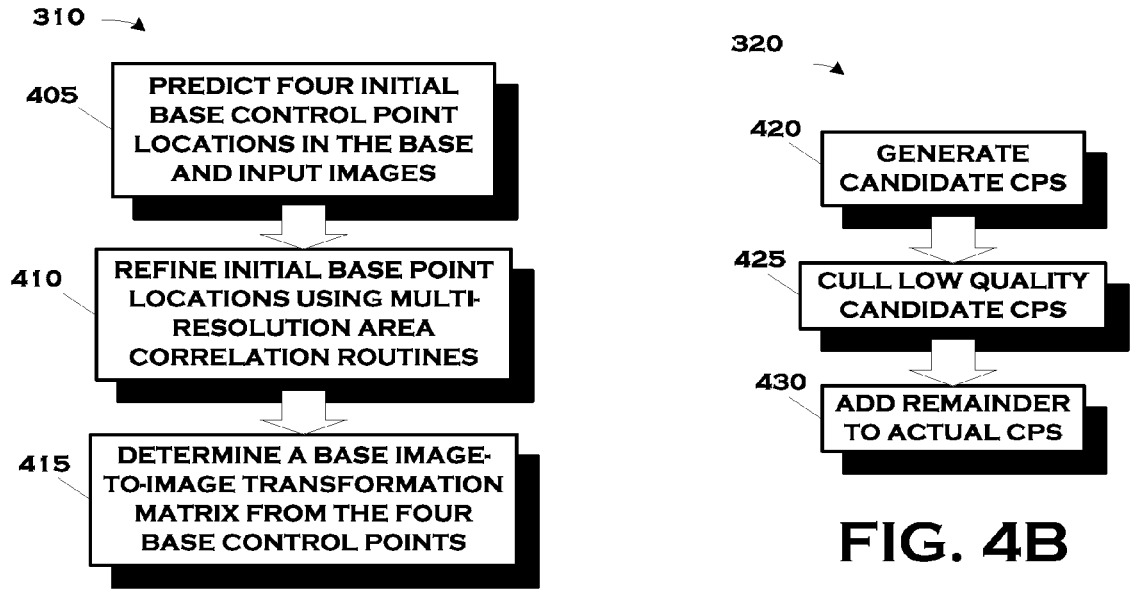
FIG. 4A
FIG. 4B
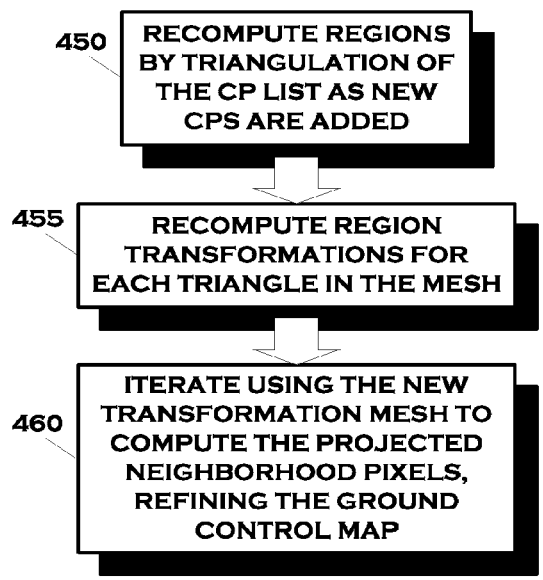
FIG. 4C

US 8,290,304 B2

ITERATIVE REGION-BASED AUTOMATED CONTROL POINT GENERATION

The earlier effective filing date of co-pending, provisional, U.S. Application Ser. No. 60/891,344, entitled, "ITERATIVE REGION-BASED AUTOMATED CONTROL POINT GENERATION", filed Feb. 23, 2007, in the name of the inventors Mark A. Wear, et al. is hereby claimed. This application is hereby incorporated by reference for all purposes as is if set forth verbatim herein.

BACKGROUND OF THE INVENTION

1. Field of the Invention

The present invention pertains to imagery processing, and, more particularly, to a technique for adding new content to an information store comprised of imagery.

2. Description of the Related Art

Some imaging applications fuse multiple images to create a composite, or mosaic, of images larger than any single constituent image. In some of these applications, the image content of the composite or mosaic image may need to be updated or otherwise changed. One way to do this is to take new images and fuse, or "paste", them into the mosaic to update the mosaic with the content of the new image.

There are a number of issues that may arise, however. It sometimes is very difficult to exactly reproduce the conditions under which the original imagery was acquired when acquiring the new image. For example, many applications use "overhead imagery", or images acquired from an airborne or space-based platform. It can be very difficult to exactly reproduce the parameters of the first acquisition in the second acquisition. The altitude or perhaps the elevation angle between the sensor and the ground features may be a little bit different. In some applications, even slight deviations in these kinds of parameters can cause difficulties.

Even if those conditions can be reproduced well, the new image must be accurately pasted into the corresponding location in the mosaic. One aspect of this process is known as "registering", which is essentially alignment. More particularly, the new image must be correctly and accurately registered with the correct location on the mosaic prior to be pasted, or fused, into the mosaic. Improper registration can sometimes invalidate the content of the mosaic in that location. This can reduce the usefulness of the mosaic for its intended purpose and, sometimes, ruin its efficacy.

The present invention is directed to resolving, or at least reducing, one or all of the problems mentioned above.

SUMMARY OF THE INVENTION

The present invention presents a technique for use in registering two images.

In a first aspect, the invention includes a computer-implemented method for use in registering a first image to a second image, comprising: generating a base transform between the first and second image from a plurality of base control point identified therein; generating a plurality of actual control points identified in both the first and second images; and generating a plurality of meshed regions from the base control points and the actual control points from which the first image may be mapped to the second image.

In a second aspect, the invention includes a program storage medium encoded with instructions that, when executed by a computing device, will perform the above method.

In a third aspect, the invention includes a computing apparatus programmed to perform the above method.

In a fourth aspect, the invention includes a data product produced by the above method.

In a fifth aspect, the invention includes a program storage medium encoded with a data product produced by the above method.

In a sixth aspect, the invention includes a computing apparatus on which resides a data product produced by the above method.

BRIEF DESCRIPTION OF THE DRAWINGS

The invention may be understood by reference to the following description taken in conjunction with the accompanying drawings, in which like reference numerals identify like elements, and in which:

FIG. 4A-FIG. 4C provide greater details of each of the stages of the method first shown in FIG. 3 for the particular embodiment illustrated herein;

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
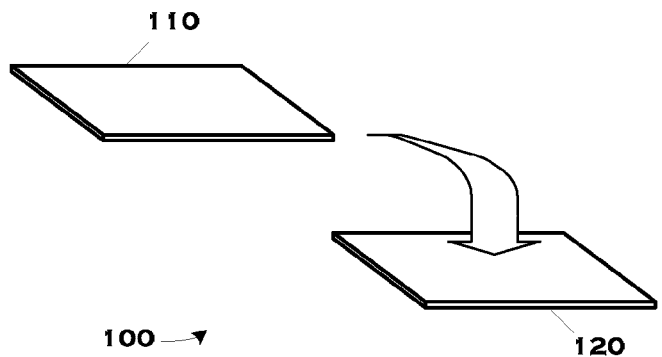
FIG. 1 graphically and conceptually illustrates the registration of a first image to a second image in accordance with the present invention.
Figure 2:
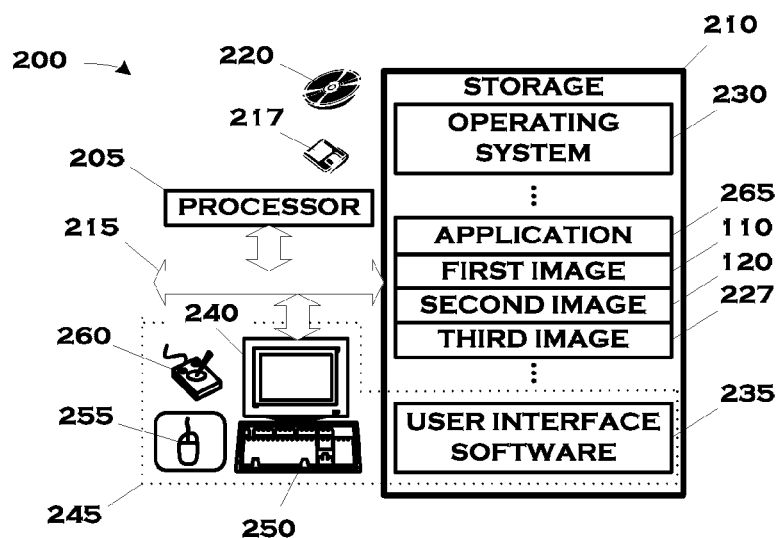
FIG. 2 is a block diagram of selected portions of the hardware and software architectures of a computing apparatus with which the method of the invention may be practiced in one particular embodiment.
Figure 3:
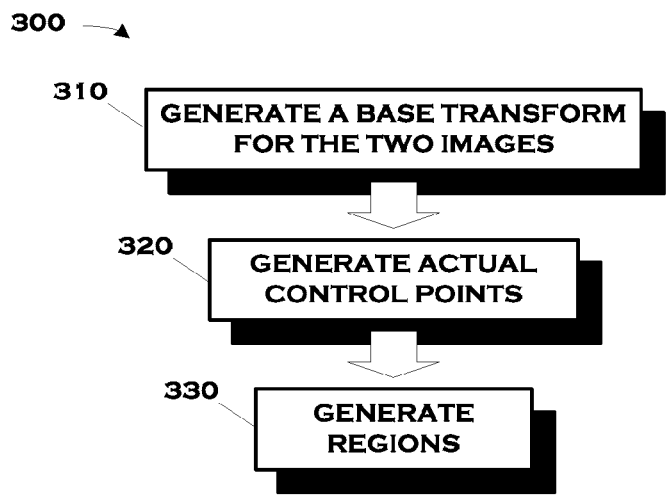
FIG. 3 charts a method practiced in accordance with another aspect of the invention for registering the two images shown in FIG. 1.

FIG. 1-FIG. 3 illustrate one particular embodiment of the present invention. More particularly, FIG. 1 conceptually illustrates the registration 100 of a first image 110 to a second image 120 in accordance with the present invention. FIG. 2 depicts in a block diagram selected portions of the hardware and software architecture of a computing apparatus 200 with which the method of the invention may be practiced in one aspect of the invention. And FIG. 3 charts a method 300 practiced in accordance with another aspect of the invention for registering the first image 110 with the second image 120, both shown in FIG. 1. The method 300 is, in this particular embodiment, implemented with the computing apparatus 200, shown in FIG. 2, as described more fully below.

Turning now to FIG. 1, the images 110 and 120 are shown in a human-perceptible form, i.e., in a hard copy. Note that this presentation is for the sake of illustration. The images 110, 120 are actually collections or sets of ordered data. In the illustrated embodiment, the data is two-dimensional. However, in other embodiments, the data may be three-dimensional. The images 110, 120 may be rendered to make them perceptible by image analysts. For example, the images 110, 120 may be rendered for output in hard copy, or they may be rendered and displayed electronically. However, some embodiments of the invention may be practiced automatically, that is, without human interaction. Thus, some embodiments may be practiced without the images 110, 120 being so rendered.

Furthermore, the present invention is disclosed in the context of imagery that is topographical and geographical in nature. The invention is not so limited, however. The invention may be used with other types of imagery as well. For example, some types of medical imaging or facial recognition applications might employ the present invention.

The illustrated embodiment implements the method of the invention with the computing apparatus 200, shown in FIG. 2. The computing apparatus 200 includes a processor 205 communicating with storage 210 over a bus system 215. The storage 210 may include a hard disk and/or random access memory ("RAM") and/or removable storage such as a floppy magnetic disk 217 and an optical disk 220.

The storage 210 is encoded with a plurality of images including the first image 110 and the second image 120 as well as a third image 227. The storage 210 is also encoded with an operating system 230, user interface software 235, and an application 265. The user interface software 235, in conjunction with a display 240, implements a user interface 245. The user interface 245 may include peripheral I/O devices such as a keypad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230. The application 265, when invoked, performs the method of the present invention. A user, typically an image analyst, may invoke the application in conventional fashion through the user interface 245.

The application 265, once invoked, performs the method 300, illustrated in FIG. 3, to register the first image 110 to the second image 120. Since the illustrated embodiment registers the first image 110 to the second image 120, the second image 120 may be referred to as the "base" image. Similarly, the first image 110 may be referred to as the "input" image. Note that these terms are but convenient labels for the communication of the present invention and that they may be referred to using still other terms in alternative embodiments.

As was mentioned above, some aspects of the invention are implemented in software. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Turning now to FIG. 3, the method 300 is, in general, a three-stage process. The method 300 begins by generating (at 310) a base transform for use in mapping points between the input and base images 110, 120 images from a plurality of base control point identified therein. The base transform is represented mathematically, and may also be referred to as, a "base matrix". The base matrix defines a base transformation that is a global mapping from one image to the other. As described below, it takes four control points to generate that transform and these four are usually spread toward the edges of the image. The method 300 then generates (at 320) actual control point(s) identified in both the input and base images 110, 120. The method 300 then generates (at 330) a plurality of meshed regions from the base control points and the actual control points from which the input image may be mapped to the base image 110, 120. Also as will be discussed further below, the regions are also transformation matrices that provide local accuracy within the base transformation. The regions are defined by three control points and they may appear throughout the images. To further an understanding of the present invention, each of these stages shall now be discussed with more particularity.

Figure 5:
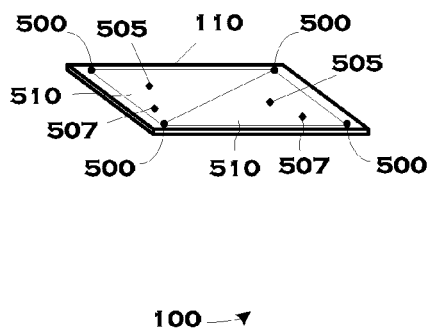
FIG. 5 conceptually depicts the predicted base control points, candidate control points, and two triangular regions determined from the predicted base control points at one point in the execution of the method in FIG. 3.
Figure 5:
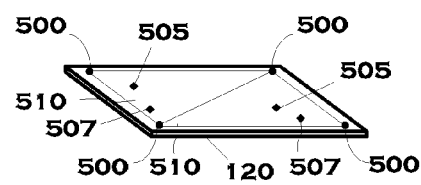

The first stage of base transform generation (at 310), as is shown in FIG. 4A, begins with the prediction (at 405) of four base control points 500, shown in FIG. 5, in the input and base images 110, 120. As will be discussed further below, the imagery with which the illustrated embodiment is used is accompanied by header information including, among other things, location information for the content of the imagery. In the illustrated embodiments, the base control points 500 are arrived at using this available image header information. The base control points 500 are shown relatively close to the respective corners of the images 110, 120 for the sake of clarity and also because this will be typical in most embodiments.

The base control points 500 are automatically selected in the illustrated embodiment but, in alternative embodiments, the base control points 500 can be manually selected. In either case, the base control points 500 are "predictions" because they undergo further refinement for accuracy in the next step. Furthermore, the base control points 500 are predicted and refined prior to the beginning of Stage Two (at 320, FIG. 3), discussed further below.

The initial base control point locations 500 predicted (at 405) above are then refined (at 410) using multi-resolution area correlation routines. Multi-resolution area correlation routines are well known in the art of image analysis, but their use in this context is not. More particularly, multi-resolution area correlation routines are well known in the art for use in refining the resolution of an image as a whole. In this aspect of the present invention, they are iteratively applied to refine the locations of the base control points 500 to achieve greater accuracy in their prediction. This is done in both the input image 110 and the base image 120.

The multi-resolution area correlation routines are applied to the pixels surrounding the base control points 500 to improve the resolution of the area surrounding the predicted locations rather than to the image as a whole. The increased resolution will permit a more accurate base control point prediction. In the illustrated embodiment, the same multi-resolution area correlation routines are applied in each iteration. However, this is not required for the practice of the invention. In alternative embodiments, different multi-resolution area correlation routines may be applied in different iterations.

For example, consider an application in which the input and base images 110, 120 are of topographical features in a particular geographic area. At a first, general level of resolution, a base control point location might be selected on the shore of a lake. A second, higher level of resolution may reveal a promontory of the shore extending into the lake in the area of the predicted base control point. The prediction may be refined by then "re-predicting" the base control point location to a point on the promontory. The "re-predicted" base control point locations then become the predicted base control point locations. The process of obtaining a higher resolution and "re-predicting" the base control point locations may be iterated until some point of diminishing returns is reached. However, note that the accuracy of the base control point locations' correlation between the input and base images 110, 120 will significantly impact the quality of the end-result registration achieved.

Thus, the illustrated embodiment uses multi-resolution analysis to detect features of different scales in the imagery for the purpose of locating the base control points 500. Matches at lower image levels of detail (at lower resolutions) are made and refined at each higher level, reducing the potential for false positives and improving performance for oblique imagery. The refinement (at 410) imparts two significant advantages over conventional practice. On the one hand, base control point selection at higher resolutions will achieve greater accuracy than can be achieved at lower resolutions. However, operating at higher resolutions is difficult because of the amount of information presented at higher resolutions. This aspect of the present invention therefore provides the advantages of both approaches—i.e., the ease of locating base control points at low resolution with the accuracy of high resolution.

Still referring to FIG. 4A, a base image-to-image transformation matrix is then determined (at 415) from the four base control points 500. The transformation matrix is a 3×3 matrix by which each pixel in the input image 110 may be mapped into the base image 120. Techniques for generating a transformation matrix from a set of control points, including base control points, are well known in the art and any suitable technique may be employed. Note that the transformation matrix may also be inverted for use in mapping pixels in the base image 120 back into the input image 110.

The second stage of identifying (at 320, FIG. 3) the actual control points 505, also shown in FIG. 5, is illustrated in FIG. 4B for the illustrated embodiment. In this particular embodiment, the identification of the actual control points (at 320, FIG. 3) begins by first generating (at 420, FIG. 4) a set of candidate control points from which the low quality candidate points 507 are culled (at 425, FIG. 4). The unculled candidate control points are then added to a set of actual control points 505 (at 430, FIG. 4B).

Figure 6:
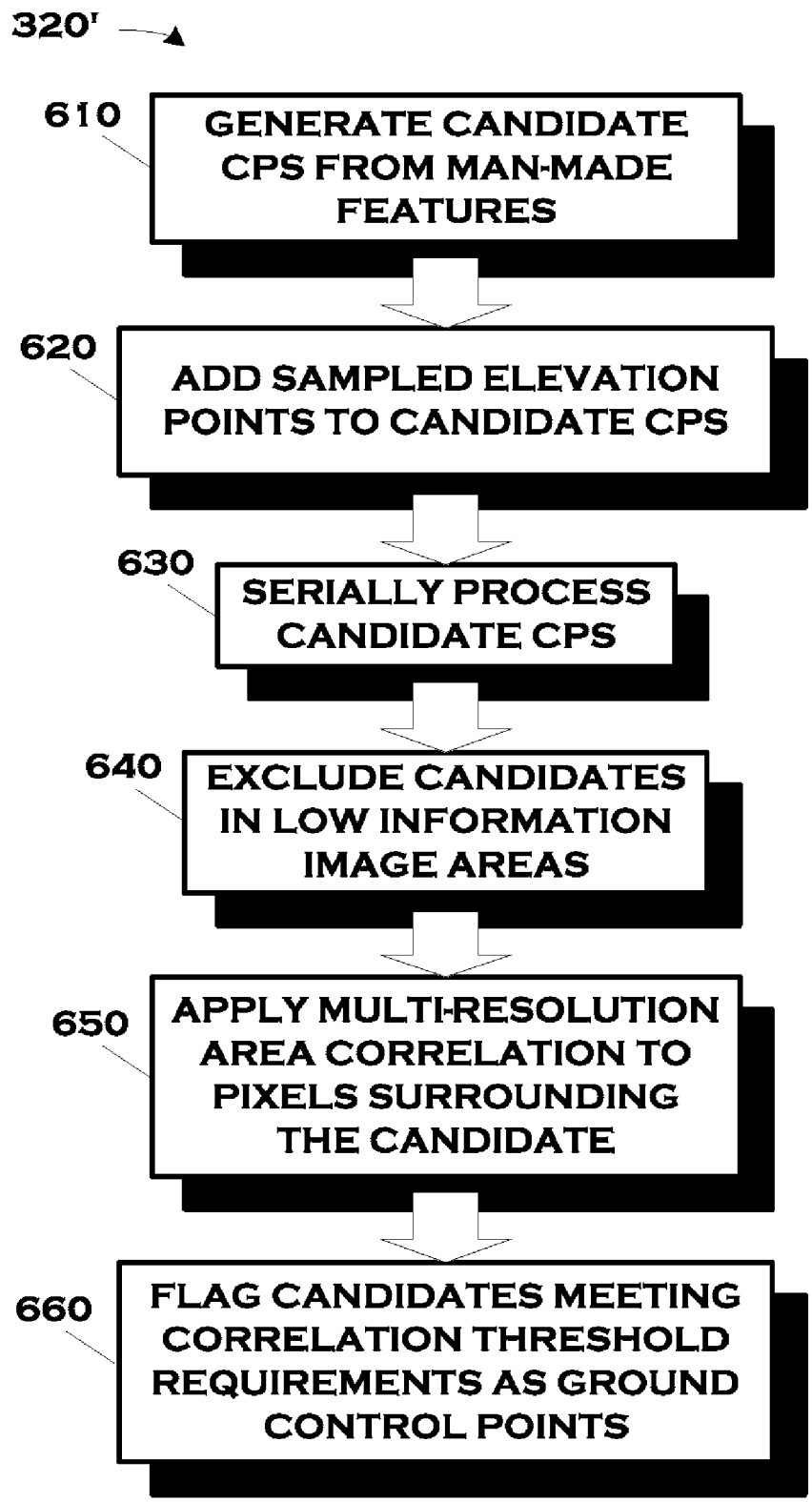
FIG. 6 illustrate the generation of the of the candidate control points first illustrated in FIG. 4B.

The generation of actual control points from candidate control points is more particularly illustrated in FIG. 6. First, in a departure from conventional practice, significant man-made features are located (at 610) and added to a list of candidate control points 505, 507. The illustrated embodiment uses corner detection techniques such as are well known in the art. One reason for this approach is that it mimics the manner in which candidate control points 505, 507 might be generated manually.

The use of "man-made" features (at 610) is an implementation specific detail. The illustrated embodiments are used with topographical imagery. Man-made features are desirable because they offer sharp contrast in the information and are readily identifiable. However, the present invention may be employed in contexts wherein the imagery might not offer man-made features. In such cases, other types of features offering advantages analogous to those of man-made features in topography may be used. For example, as mentioned above, the invention may be used in facial recognition systems. In this context, the corners of the eyes and eyebrows may be used instead of man-made features. Those in the art having the benefit of this disclosure will be able to readily extrapolate this teaching to still other contexts.

Because of the nature of the images 110, 120 used in the illustrated embodiment, as will be discussed further below, they have associated therewith what is known as Digital Terrain Elevation Data® ("DTED") at known post locations within the images 110, 120. DTED is available from the National Geospatial-Intelligence Agency of the United States federal government. Additional information for DTED is available from that agency at NGA, Office of Corporate Relations, Public Affairs Division, MS D-54, 4600 Sangamore Road, Bethesda, Md. 20816-5003 or over the World Wide Web of the Internet at http://www.nima.mil/portal/site/nga01/indexjsp?front_door=true. The DTED post locations also provide candidate control points 505, 507 that are added (at 620) to the candidate control point list. In the illustrated embodiment, the DTED data is sampled such that not every DTED post location is made a candidate.

Note, however, that DTED data is but one kind of elevation data. DTED data is used in the illustrated embodiment because it is commonly used in the industry, is readily available, and is the government standard for this type of information. Other elevation data is available and may be used in alternative embodiments.

Those skilled in the art having the benefit of this disclosure will furthermore appreciate that the elevational data such as DTED data is not actually a part of the image. More technically, the imagery employed in the illustrated embodiment comprises what may be more generically referred to as "geospatial content". Conventional geospatial content is constructed as a set of one or more layers of intrinsically georeferenced data. The geospatial relationship between each unit (vertex, pixel, post, etc.) of the data making up a layer is known either explicitly through its definition or implicitly through metadata-based calculations. Typically, the multiple layers are "co-registered", or mapped to each other. The elevation data is one such layer, and is registered with the pixel layer referred to above as "imagery". Not all embodiments, however, will employ such layered information.

The elevation locations therefore are not imagery features. They are terrain features that exist in a separate data layer that is registered to one of the images. For each image location, once can query the elevation layer to find out what the height at location is. The illustrated embodiment uses points of interesting elevation locations to place a control point because the imagery will be distorted by that elevation. A ridge for example will distort the geographic position of the pixels that make up that ridge in the image, moving them from their location predicted by the base matrix to somewhere else that will be captured by a region matrix, i.e., one of the aforementioned meshes.

For generation of candidate control points from both man-made features (at 610) and DTED post locations (at 620) the degree of sampling will depend on the density of the man-made features or DTED post locations. As an example, in a level 1 or level 2 DTED, perhaps every third post location can be made a candidate control point 505, 507. In general, the user (e.g., an image analyst) trades between accuracy (point density) and processing time. This will vary from implementation to implementation in a manner that will be apparent to those skilled in the art having the benefit of this disclosure.

Accordingly, the illustrated embodiment draws candidate control points 505, 507 from two sources within the input and base images 110, 120. Candidate control points 505 are created in a manner that mimics the way in which a man-in-the-loop would create them. Hard, man-made edges (e.g. corners of buildings, road intersections, etc.) are detected in the image and added to the control point candidate list. These candidate control points 505 augment the traditional DTED-locked list typically used in conventional practice as well as in the illustrated embodiment.

Those in the art will appreciate that the number of candidate control points 505, 507 will be dependent on a number of factors. Only four candidate control points 500, 507 are shown in FIG. 5 for the sake of clarity and so as not to obscure the present invention. Most implementations will typically yield many more. The actual number will be a function of such well known factors as the size of the input and base images 110, 120, the content of the images 110, 120, and their resolution. More candidate control points 505, 507 will generally yield better results, but a point of diminishing returns can be reached. For example, more candidate control points 505, 507 will require more processing time, which will be more expensive. Those implementations sufficiently constrained by money and/or time may therefore use lesser numbers candidate control points 505, 507 than those that are not so constrained.

The candidate control points 505, 507 are then processed (at 630) serially off the candidate control point list. Note that the candidate control points 505, 506 are not ordered in the list in any particular manner and that they may be processed in any convenient order.

In another departure from conventional practice, each candidate control point 505, 507 is first examined (at 640) to determine whether it comes from an image area containing low information. Areas of limited detail such as water or deserts are prone to false positive matching. Low information exclusion ("LIE") eliminates suspect candidate control points 507 from consideration before the matching algorithm is applied as described below. LIE computes a measure of the amount of information contained within the neighborhood of pixels surrounding the candidate. Candidate neighborhoods 507 with low information values are eliminated from consideration and removed as candidate control points 505, 507.

Techniques for evaluating information content are well known in the art. Several statistical techniques are used, and they typically determine the variation in the content within a prescribed area. Any of these techniques may be used for this purpose. What constitutes a "low" degree of information will be a function of implementation specific factors well known to the art. One principle determinant is whether it will lead to an unacceptably high level of false matches. Other factor might include, for example, the degree of overall information content in the imagery. Each of these factors will vary depending on the end-use of the imagery.

The illustrated embodiments are used with topographical and cultural information, and so deserts and large bodies of water have relatively low areas of information content as a general rule. An information value would be considered 'low' if it is equal to or less than values computed for areas such as water, desert, snow covered regions, etc. (areas prone to false-positive matching) for the given energy/information/entropy computation used. The particular measure of information used in the illustrated embodiments is what is known as "neighborhood, normalized variance." Other end uses will foster other rules of thumb and conventional wisdom that may be employed in this context.

For those candidate control points 500, 507 surviving the LIE (at 640), a multi-resolution area correlation is applied (at 650) to the neighborhood of pixels surrounding the candidate point. Any suitable multi-resolution area correlation known to the art may be used. The multi-resolution area correlation used here in Stage Three may be the same as that used in Stage One mentioned above. However, the use of the multi-resolution area correlation in Stage Three is in accordance with conventional practice whereas its use in Stage One is not.

The surviving candidate control points 505, 507 are then examined (at 650) to see whether they meets certain threshold requirements and, if so, they are flagged (at 660) as an actual control point 505. The threshold requirements are essentially a quantification of the confidence that the candidate control point 505, 507 in the input image 110 is a true match to the counterpart control point candidate 505, 507 in the base image 120. The confidence quantification for the candidate control point 505, 507 is compared to a predefined threshold quantification. If it meets or exceeds the threshold, then the candidate control point 505 becomes an actual control point 505.

Some embodiments might forego identification and culling of candidate control points altogether. These alternative embodiments might directly select actual control points in any number of ways. For example, actual control points might be directly selected for compliance with some predetermined pattern. Actual control points might also be directly selected according to affirmative application of one or more criteria. Pixels exceeding some predetermined intensity, for example, might be selected as control points. These affirmative criteria will be implementation specific since individual criteria might be accorded more or less importance depending on the implementation.

Stage Three region generation (at 330, FIG. 3) is shown in FIG. 4C. At this point in the process, the base control points 500 are identified in both the input and the base images 110, 120. In accordance with conventional practice, the four base control points 500 are used to generate two "regions" 510, shown in FIG. 5, in the input and base images 110, 120. More technically, a base matrix has been generated in Stage One that is used for areas outside the "regions"—i.e., used for any pixel that falls outside the triangle mesh. Two region transforms are also generated for all the pixels that fall inside—i.e., inside the regions 510. If there are any errors in the region transforms, such as might arise from a bad actual control point, the base matrix is used during processing as a fallback.

The regions 510 are generally triangular in shape and may be generated at the time the base control points 500 are predicted or after the candidate control points 505 are determined. There are many techniques well known in the art for their generation. Any suitable technique known to the art may be used. Note that each region 510 has an associated transformation matrix.

Figure 7:
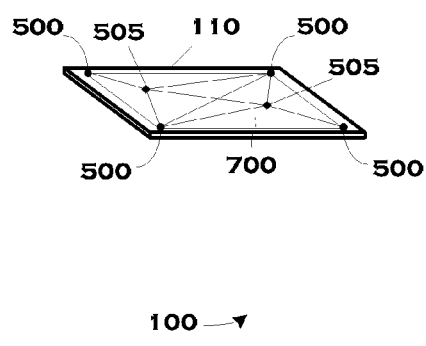
FIG. 7 conceptually depicts a plurality of triangular regions determined from the predicted base control points and control points at a second point in the execution of the method in FIG. 3.
Figure 7:
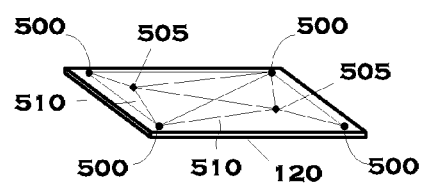

As each actual control point 505 is added in Stage Two as described above, the regions 700 (only one indicated), shown in FIG. 7, they define are recomputed (at 450) by triangulation of all the actual control points 500 on the control point list. This is yet another departure from conventional practice. While the use of region-based methods of ground control mapping is common, employing a continuous or iterative refinement of the region mesh as new control points are generated is an innovation. Region generation typically occurs after all control points 500, 505 have been collected. In this approach, each successive control point 500, 505 refines prediction transforms, improving subsequent performance as new control point candidates are considered.

Thus, rather than waiting for all the control points 500, 505 to be identified and then determining the regions 700 all at one time, the present invention iteratively determines the regions 700 defined by the control points 505 and the base control points 500 over time. The intermediate and end result is a "mesh" of triangular shaped regions such as the regions 700. In each iteration, as the regions 700 are redetermined, the region transformations are recomputed (at 455) for each triangle in the mesh.

Stage Three then iterates (at 460) for each candidate control point 505 generated in Stage Two. Each iteration uses the new transformation mesh arrived at in the preceding iteration to compute the projected neighborhood pixels, refining the ground control map. The end result, as shown in FIG. 7, is a plurality of regions 700 defined in each of the input and base images 110, 120 and their associated transformation matrices. The transformation matrices can then be used to map the input image 110 onto the base image 120 to produce a third image 227, shown in FIG. 2. The third image 227 is essentially the base image 120 updated with the new information presented by the input image 110. Note that some embodiments may not generate a third image 227, but rather may update the second image 226 with the first image 225 and then write the new second image 226 over the old, stored second image 226.

Each of the stages discussed above in the illustrated embodiment include some departure from conventional practice. Note that not all of the departures must be practice in every embodiment of the invention. For example, Stage Two of the illustrated embodiment employs both LIE and continuous region refinement. Neither of these requires the practice of the other and so some embodiments may employ one to the exclusion of the other. Stage One employs multi-resolution matching in base control point prediction and Stage Two uses corner detection. Both of these are independent of each other was well as LEI and continuous region refinement in Stage Three. Accordingly, various embodiments may employ any one, any combination, or all of the departures from conventional practice noted above.

To further an understanding of the present invention, one particular embodiment shall now be disclosed in the context of its intended end use. This particular embodiment is a tool in an image tool suite for a mission simulator used by the United States Armed Forces and marketed by the assignee hereof under the mark TOPSCENE®. TOPSCENE® utilizes overhead image data from satellites and other sources, and converts the two dimensional images into three-dimensional "fly through" and "walk through" battlefield visualization simulation scenarios. By using real-world images, warfighters can repeatedly practice a mission, taking advantage of visually significant clues and aim points. More particularly, TOPSCENE® combines two-dimensional images with elevation data and, using mosaic/orthogonal map construction, rectification and radiometric balancing, turn those images into a three-dimensional scene. Additional information regarding TOPSCENE® is widely available from public sources including, inter alia, the World Wide Web of the Internet.

One way to think about TOPSCENE® and similar technologies is as a simulated environment comprised of a terrain visualization layered with improvements such as structures and infrastructure. Because of its battlefield nature, the simulated environment can be very dynamic. Topography may be altered negatively or positively by, for example, constructing fortifications such as ditches or earthworks. However, structure and infrastructure will typically be much more dynamic. Structure and infrastructure may, in relatively short order, be constructed, damaged, repaired, and/or destroyed. Accuracy of the simulation means that the simulated environment must also be updated and, given the ubiquity of precision munitions, positioning and location are also very important. Thus, one utility and some of the value of the present invention.

Figure 8:
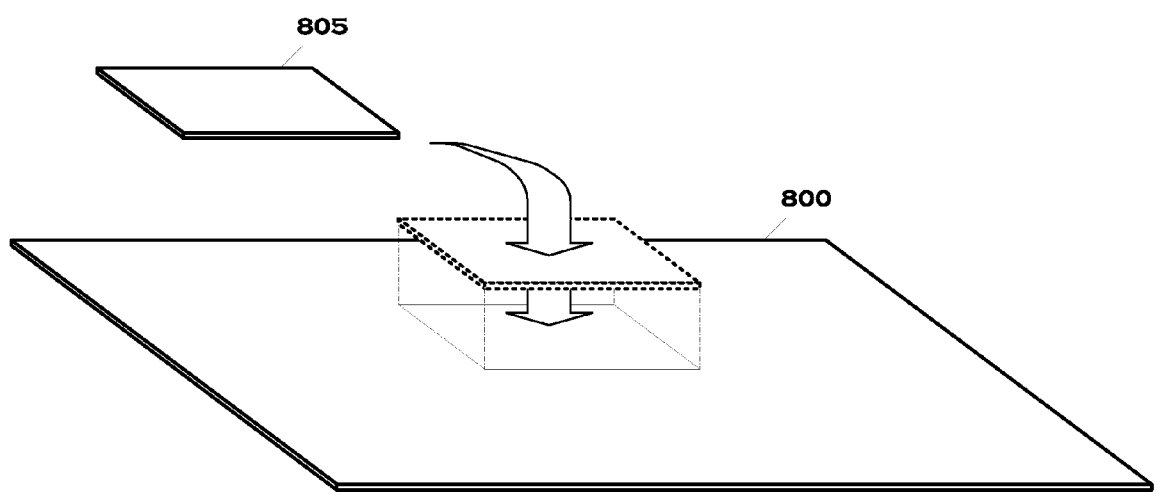
FIG. 8 depicts the registration of an input image with a corresponding portion of a base mosaic in one particular embodiment of the present invention.

Turning now to FIG. 8, the existing simulated environment discussed above comprising the visualized terrain overlaid with structure and infrastructure is referred to as the "base mosaic" 800. The base mosaic 800, in general is constructed from photogrammetric imagery data that is not separately shown. "Photogrammetry" is the science of making reliable measurements by the use of photographs, especially aerial photographs. One type of photogrammetric process produces three-dimensional graphic images from two-dimensional aerial photographs. The two-dimensional photographs are typically obtained from an airplane or a reconnaissance satellite.

There are many techniques for accomplishing this task depending on the manner in which the two-dimensional photographs are taken. Some techniques involve how the photograph is taken while others involve complicated post-flight processing. As part of the photogrammetric process, two-dimensional data is combined with elevational data. When the latitudinal longitudinal, and elevational data is combined with an observation point and an orientation, realistic three-dimensional view of the environment can be obtained.

The photogrammetric imagery may be overlaid with additional information to enhance its usefulness. For instance, the imagery can be overlaid with visual representations of surrounding vehicular traffic or cultural features such as buildings. The photogrammetric imagery can also be manipulated for use in certain formats such as those for displaying a heads-up display ("HUD") or as seen through certain instruments such as night vision goggles. Many such features might be added to various embodiments to enhance their utility for certain applications.

This type of photogrammetric imagery is now commercially available from several sources and has many uses because it accurately depicts a real environment in three-dimensions. In the illustrated embodiment, the photogrammetric imagery data is developed a priori, either using proprietary systems or from commercially available sources. One product known to the art that may be used for the base mosaic 800 is the Controlled Image Base® ("CIB®") available from the National Geospatial-Intelligence Agency of the United States federal government. A second product is the Digital Point Positioning Database ("DPPDB") available from the National Imagery and Mapping Agency ("NIMA"), also of the United States federal government. Other public sources of information are available over the World Wide Web of the Internet, such as at http://www.fas.org/irp/program/core/dppdb.htm.

Regardless, in this particular embodiment, the base mosaic 800 comprises a two-dimensional ("2-D"), large-area terrain digital map draped over polygonized DTED and enhanced with three-dimensional ("3-D") cultural data. 3-D terrain imagery enhancements permit changes in visibility, time of day, sensor imagery and graphic overlays. Vertical photographs are combined with the terrain data, digitized and computer-constructed into a mosaic-orthogonal map containing large areas covering country-sized areas (tens of thousands of square kilometers).

The input image 805 may be an image acquired in any number of ways. Historically, input imagery such as this was acquired from reconnaissance satellites or from high altitude reconnaissance aircraft but more recently it has also been acquired from unmanned aerial vehicles ("UAVs"). However, the invention in this embodiment is not limited by the manner in which the input image 805 is acquired, so long as it is overhead imagery. Furthermore, as noted elsewhere, the invention may be applied in contexts other than the use of aerial imagery. In a general sense, then, the invention is not limited to the use of aerial, or even overhead, imagery in all embodiments.

Figure 9:
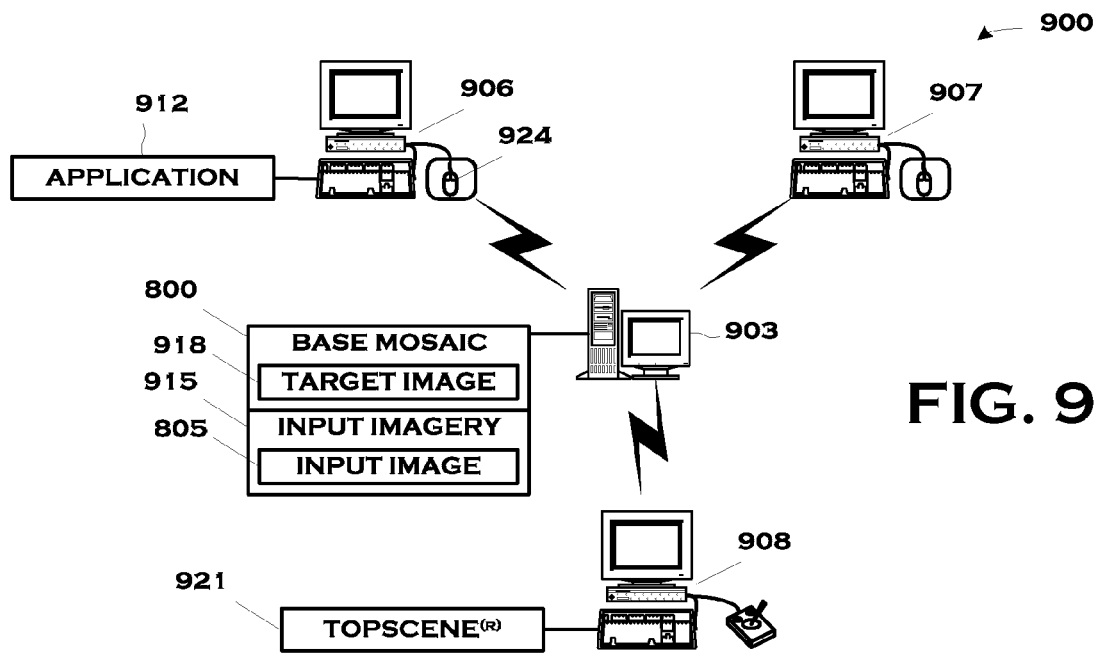
FIG. 9 depicts in a block diagram selected portions of the hardware and software architectures of a computing system with which the embodiment of FIG. 8 may be implemented.

The embodiment disclosed above presents the invention as being implemented on a single computing apparatus. More typically, the invention will be implemented across a computing system such as the computing system 900, shown in FIG. 9, comprising more than one computing apparatus. The computing system 900 employs a networked client/server architecture, including a server 903 and a plurality of workstations 906-908. Those in the art having the benefit of this disclosure will appreciate that the computing system 900 may include any number of servers and workstations, as well as other types of computing apparatuses, including desktop computers, peripheral devices, and even wireless devices.

However, there is no requirement that the computing system 900 be networked. Alternative embodiments may employ, for instance, a peer-to-peer architecture or some hybrid of a peer-to-peer and client/server architecture. The size and geographic scope of the computing system 900 is not material to the practice of the invention. The size and scope may range anywhere from just a few machines of a Local Area Network ("LAN") located in the same room to many hundreds or thousands of machines globally distributed in an enterprise computing system.

Data such as the input imagery 915 and the base mosaic 800 is typically very voluminous by nature and so is stored in relatively large data structures. This volume mitigates for certain implementation-specific design choices evident in the computing system 900.

One such feature is the storage of the data. The computing system 900 includes at least one apparatus capable of mass storage, such as the server 903. Alternative types of mass storage may also be employed, particularly external disk drives such as redundant arrays of independent disks ("RAIDs"). The data storage will frequently be read-only and implemented in an optical medium, i.e., a CD-ROM or DVD ROM. Again, any suitable data structure known to the art may be used.

Note that, in the illustrated embodiment, the imagery is all shown residing on the storage of a single apparatus. That is, the base mosaic 800 and the input imagery 915 are shown residing in the storage of the server 903. This also is not necessary to the practice of the invention. The imagery may be distributed in storage across the overall computing system 900.

A second such feature is the processing implementation. In addition to handling voluminous data, the illustrated embodiment includes seeks real-time or near real-time performance. Thus, some kinds of processors are more desirable than others for implementing the mission computer 725 than others. For instance, a digital signal processor ("DSP") or graphics processor may be more desirable for the illustrated embodiment than will be a general purpose microprocessor. The Onyx® VTX R4400 and/or R10000 graphics processors available from Silicon Graphics, Inc. and associated hardware (not shown) may be suitable for the illustrated embodiment, for instance. Other video handling capabilities might also be desirable. For instance, a joint photographic experts group ("JPEG") or other video compression capabilities and/or multi-media extensions may be desirable.

The functionality of the present invention in this embodiment is located in the application 912 residing on the workstation 906. Note that, because the illustrated embodiment is intended for use with the TOPSCENE® system, the application 912 will form a portion of the TOPSCENE® Database Generation System not otherwise shown. However, this is an implementation-specific detail and the manner in which the functionality is implemented (e.g., as an application or a utility, standalone or as part of larger system) does not limit the scope of the invention in its broader sense. Typically, the creation and maintenance of the base mosaic 800 is, in the case of TOPSCENE®, done offsite and transported onsite on a plurality of optical disks. More particularly, the databases are stored on hotswap hard drives, 8 mm tape, or digital video disks that are then distributed to the deployable units.

Figure 10:
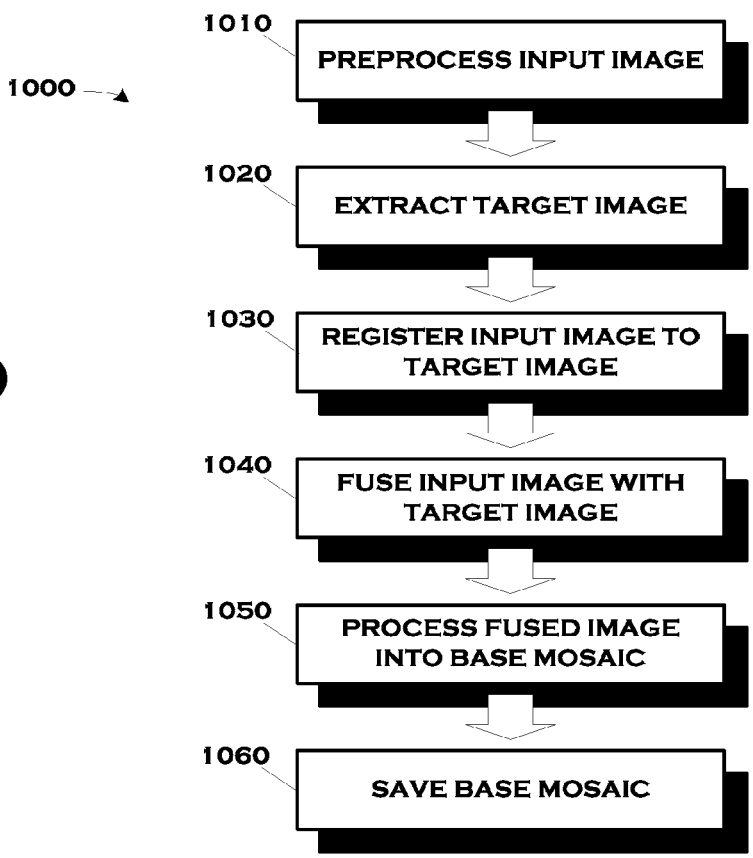
FIG. 10 illustrates a process associated with and implemented by the computing system of FIG. 9.

A user accesses both the input imagery 915 and the base mosaic 800. Each input image 805 in the input imagery 915 is processed in accordance with the method 1000 shown in FIG. 10. In general, some preparatory work is first performed, including preprocessing (at 1010) the input image 805 and extracting (at 1020) the target image 918. Preprocessing (at 1010) the input image 805 primarily includes converting the input image 805 to a format compatible with the base mosaic 800 and the process to be employed.

Both the input imagery 915 and the base mosaic 800 are accompanied by header information (not shown). The header information is stored in the image itself in accordance with conventional practice. It provides, among other things, the geographical locations of the various points in the imagery. More particularly, the imagery is indexed by geographic location (e.g., longitude and latitude) that may be used to navigate through the input imagery 915 and the base mosaic 800. Thus, once the input image 805 is identified, the target image 918 can be extracted (at 1020) from the base mosaic 800 using the header information accompanying both sets of data.

Once the input image 805 has been preprocessed (at 1010) and the target image 918 has been extracted (at 1020), the input image 805 is registered (at 1030) to the target image 918. The registration (at 1030) is performed using the method generally disclosed above relative to FIG. 3 and FIG. 4A-FIG. 4C. Once registered, the input image 805 is fused (at 1040) to the target image 918 and the fused image is then processed (at 1050) back into the base mosaic 800. The updated base mosaic 800 is then saved (at 1060).

Note, however, that although each input image 800 may be processed serially, the whole method 1000 might not be performed completely serially in all embodiments. For example, each input image 805 in the input imagery 915 might be collectively preprocessed (at 1010) with the other input images 805 prior to extracting (at 1020) their respective target images 918. Similarly, the method 1000 might practiced in a manner in which each of the input images 805 have been registered (at 1030), fused (at 1040), and processed (at 1050) prior to saving (at 1060) the base mosaic 800.

Figure 11A:
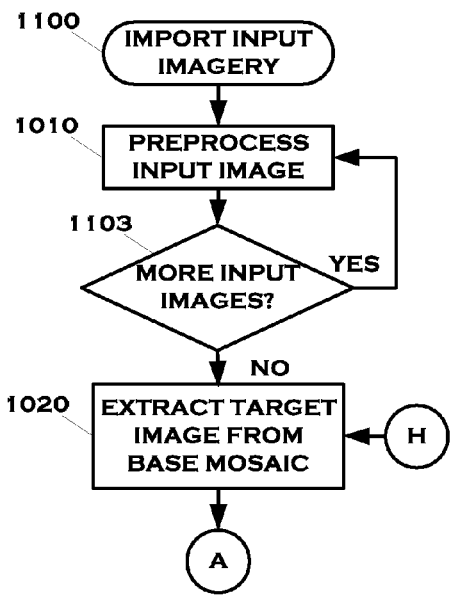
FIG. 11A-FIG. 11F illustrate the method of FIG. 4A-FIG. 4C as implemented in the embodiment of FIG. 8-FIG. 10.

To further an understanding of this particular embodiment of the present invention, the method 1000 is shown in greater detail in FIG. 11A-FIG. 11F. As shown in FIG. 11A, the method 1000 begins, again, with the importation (at 1100) of the input imagery 915. The importation may be direct from the source, such as by wireless transmission or over a network connection, or indirectly, such as from an archive over a network connection or from removable storage, such as magnetic disks, magnetic tapes, or optical disks.

An input image 805 is then preprocessed (at 1010) and a respective target image 918 extracted (at 1020) from the base mosaic as was discussed above. Note that the preprocessing (at 1010) iterates (at 1103) until each of the input images 805 is preprocessed. The preprocessing (at 1010) and the extraction (at 1020) are performed in accordance with conventional practice. Accordingly, detail in addition to that provided above will not be presented so as not to obscure the present invention.

Figure 11B:
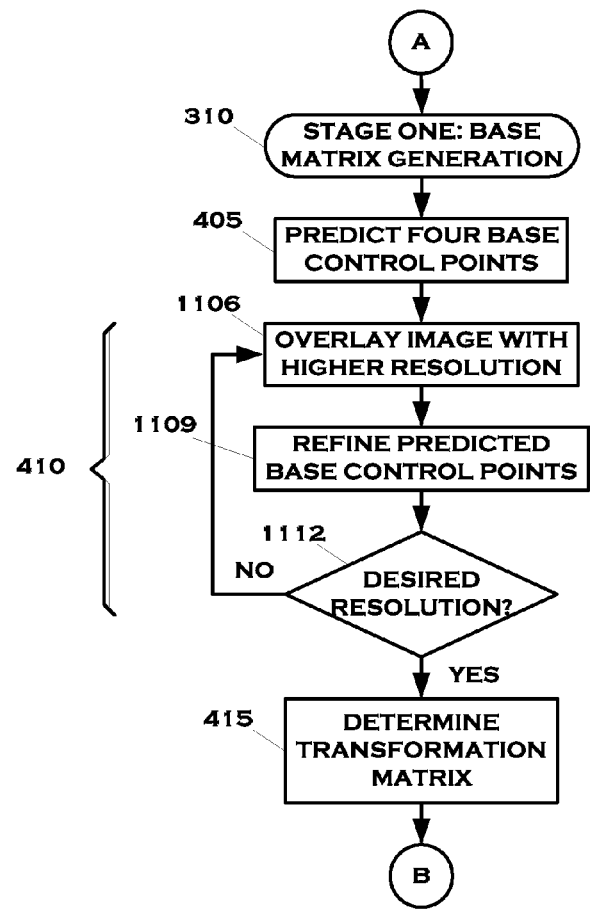

Turning now to FIG. 11B, the process then enters (at 1103) Stage One, base matrix generation. Stage One proceeds by first predicting (at 405) initial base control points 500, shown in FIG. 5. The base control points 500 are chosen using the header information mentioned above, and typically are just inside the four corners of the image. Note that the shape of the images is not material to the practice of the invention and that images may be handled in other shapes, e.g., squares or triangles. The initial base control points 500 are then refined (at 410) through an iterative process. More particularly, the multi-resolution area correlation routines are applied (at 1106) to the images 805, 918, the predictions are refined (at 1109) as described above, and the process is iterated (at 1112) until a desired resolution is achieved. Once the desired resolution is achieved (at 1112), the transformation matrix is then determined (at 415).

Figure 11F:
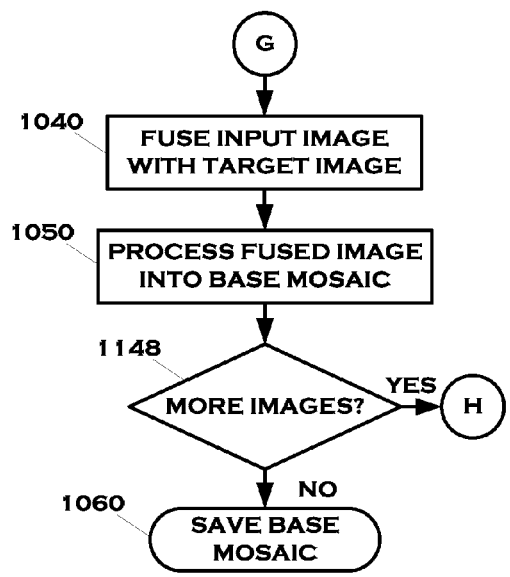
Figure 11C:
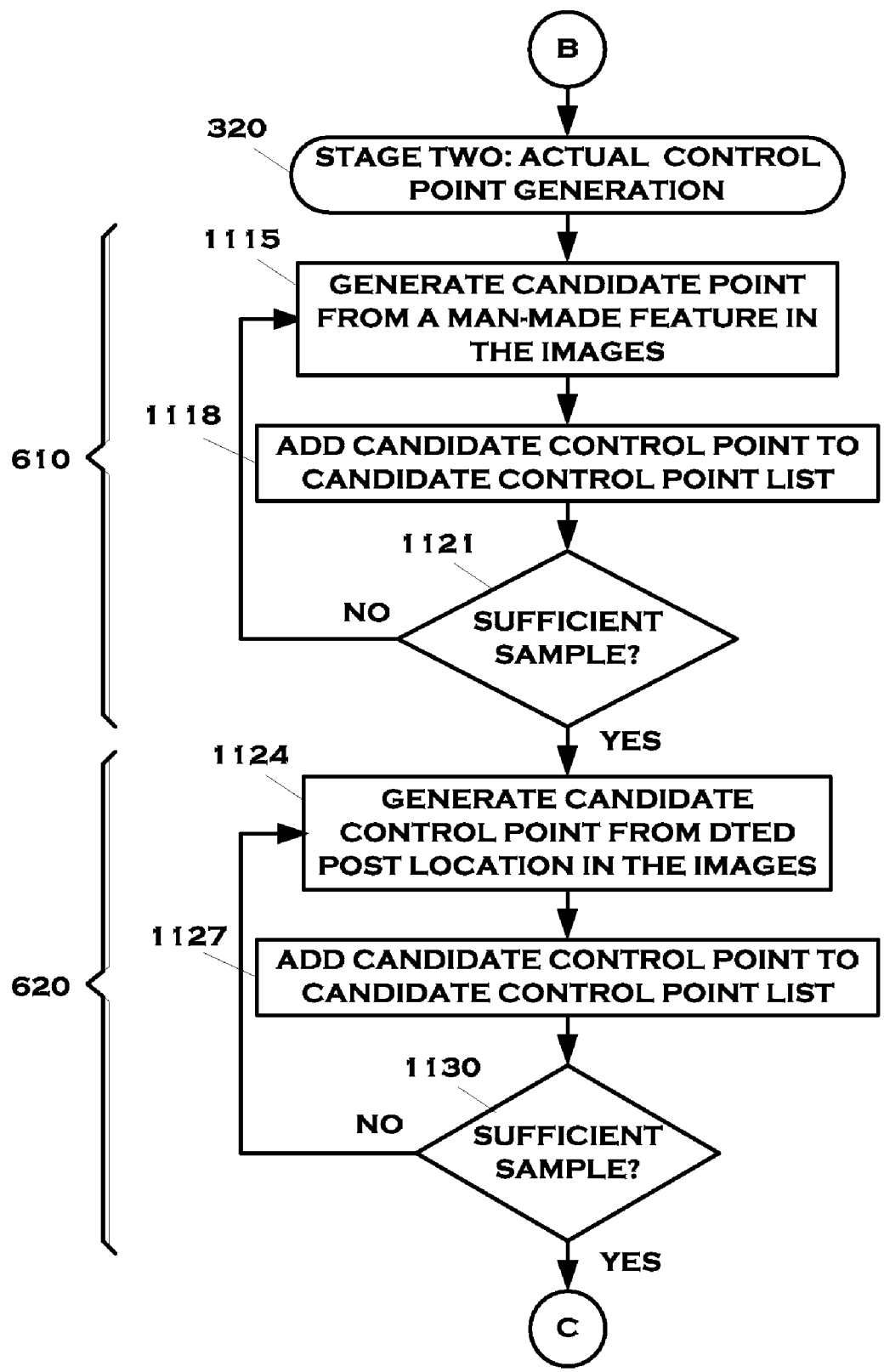

The process then enters (at 320) the Stage Two candidate control point generation, as shown in FIG. 11C. This generally comprises generating (at 610, 620) candidates from man-made features in the images and from DTED post locations. In each part, the candidate is generated (at 1015, 1124) and adds it to a list (at 1018, 1127). This iterates (at 1021, 1130) until a sufficient sampling has occurred to populate the list to a desired level. Note that the level of sampling for man-made features and DTED post locations are not necessarily tied, and different levels may be desirable in some embodiments.

Figure 11D:
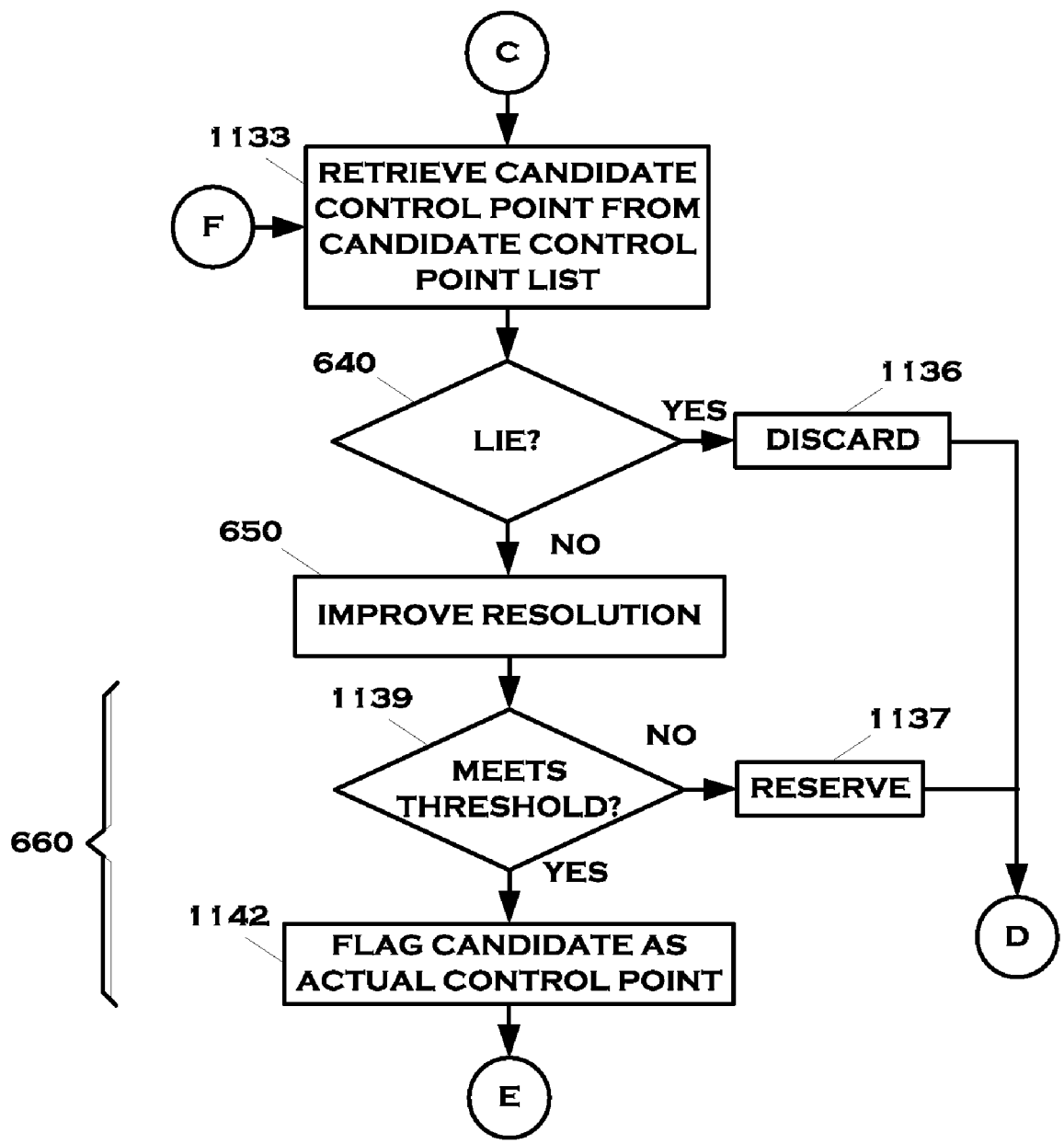

The method continues in FIG. 11D by retrieving (at 1133) a candidate control point from the list generated in Stage Two (at 320) and determining (at 640) whether it comes from a low information area of the images. If so, the candidate is discarded (at 1136). (That is, LIE is performed on the candidate.) If not, then the multi-resolution area correlation routines are applied to improve the resolution (at 650) and the candidate is tested against a threshold (at 1139). If the candidate fails to meet the threshold (at 1139), then it is reserved (at 1137) to a "hold list." If the candidate meets the threshold (at 1139), it is added (at 1142) to the collection of control points.

Thus, once a set of candidate control points is generated, the candidate control points are evaluated against the threshold. The user can adjust the threshold at that point, tagging each control point as either "in" or "out". In the man-in-the-loop embodiment, the user does this by making sure that the points that are tagged as "in" are indeed accurate. The user does this by inspection of some random subset of those points. Some embodiments could also put in place a statistical based approach that would try to set this threshold automatically. Once the threshold is set, any point not tagged as "In" is considered on the reserve list. In some embodiments, there may be only a single list with points tagged "in" or "out". Some embodiments may employ a "button" on the user interface that clears the points that are not "in". This simplifies the list, but in fact the control points not "in" are ignored when we create the region mesh. Typically the "out" candidate control points are kept because one may get several stages into the process and want to go back and see how things might work with a different threshold.

Figure 11E:
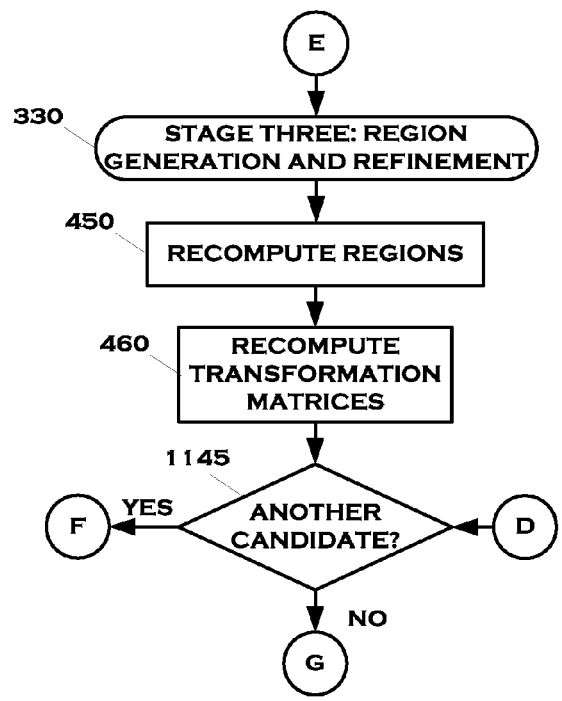

The process then enters (at 330) Stage Three, region generation and refinement, as shown in FIG. 11E. Stage Three begins and the regions are recomputed (at 450) as are the transformations (at 460). The process iterates (at 1145) until there are no more candidates.

Turning now to FIG. 11F, once the input image 805 is processed through Stage Three, it is fused (at 1040) with the target image 918 and the fused image is processed (at 1050) into the base mosaic 800. The process iterates (at 1148) until all the images are processed. Once all the images have been processed (at 1148), the base mosaic 800 is saved.

Returning now to FIG. 9, the updated base mosaic 800 can then be used for fresh rehearsal of mission scenarios on the TOPSCENE® simulator. Construction of new fortifications or infrastructure, or destruction of old fortifications and infrastructure, for instance, occurring since the base mosaic 800 was previously updated are now reflected in the base mosaic 800. Thus, when a user invokes the TOPSCENE® application 921 on the workstation 908, the mission rehearsal is more accurate because it will reflect recent changes to the actual environment that is being simulated.

Note that the embodiment illustrated in FIG. 8-FIG. 11F is but one particular embodiment, and the invention may find other applications and may be implemented in alternative embodiments. For example, in the illustrated embodiment, a candidate control point that fails to meet a threshold (at 1139, FIG. 11D) is reserved to the hold list (at 1137, FIG. 11D). However, it may be difficult to evaluate the level of the threshold a priori. A user may find that, after processing the input imagery, a lower threshold may be desired. After performing the process and evaluating the results, the user may reset the threshold and rerun region generation (at 450, FIG. 11D) and transformation matrices regeneration (at 455, FIG. 11D) with the new threshold and the previously reserved candidate control points from the hold list.

Figure 12:
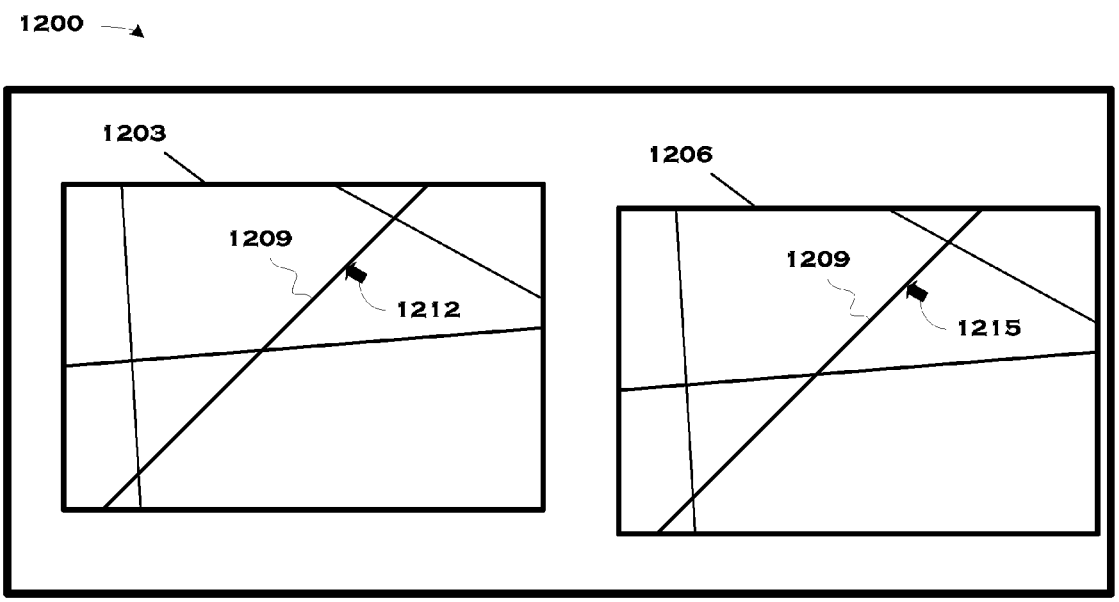
FIG. 12 illustrates a projected cursor capability as may be employed in some embodiments of the present invention.

Furthermore, the illustrated embodiment employs an optional feature that may be omitted in some embodiments. FIG. 12 depicts a display 1200 on the workstation 906, shown in FIG. 9, on which the present invention is implemented. The display 1200 includes two "viewers" 1203, 1206 in which the input image 805 and the target image 918, respectively, are shown. The images 805, 918 depict a geographical region including a plurality of roads 1209 (only one indicated in each image 805, 918). A "true" cursor 1212—the cursor controlled by the user through the peripheral device, or mouse, 924 of the workstation 906—for the display 1200 is shown on the viewer 1203. Because the present invention processes control points serially, and recomputes regions and transformations for each control point as it is processed, the second viewer 1206 can "project" a second cursor 1215 onto the target image 918.

More particularly, after each control point is identified, the regions and transformations are recomputed. The second viewer 1206 can "read" or "know" the location of the true cursor 1212 in the first viewer 1203, apply the applicable transformation, and project the second cursor 1215 onto the image 918. One significant consequence of the projected cursor 1215 is that the user can trace some feature in one of the images—e.g., the road 1209 in the image 805—and observe how well the projected cursor 1215 tracks the movement of the true cursor 1212. The degree to which the projected cursor 1215 accurately tracks the true cursor 1212 is then a measure of the accuracy of the registration between the images 805, 918.

The correlation between the true cursor 1212 and the projected cursor 1215 may also be performed automatically. In these embodiments, correlations are determined between the first and second images in the control point generation. The projected cursor 1215 then demonstrate the correlation—that is, what the image map (mesh) thinks is the same location in each image. As the true cursor i1212 s moved, the predicted location in the other image is highlighted by the projected cursor 1215. A user would use this by mousing over features in one image and verifying that the cursor is projected onto the same feature in the other image.

Thus, the user can make a manual evaluation of whether the registration is sufficient, or whether Stage Two and/or Stage Three discussed above should be repeated with greater sampling or lower thresholds. This essentially permits the user to "preview" the results of the registration for evaluation of its efficacy. Because the user can make a manual, visual determination, the present invention affords a semi-automatic processing technique intermediate the manual and automated techniques currently known to the art. Accordingly, this semi-automated technique provides advantages over the automated techniques by providing a more active, particularized control by the user and over the manual techniques by providing quicker results in those portions that are automated.

Note that the design, construction, and implementation of viewers such as the viewers 1203, 1206 are well known in the art. Accordingly, implementation of the "projected cursor" capability should be well within the ordinary skill of those in the art having the benefit of this disclosure. Furthermore, because the transformation matrices can be inverted to map in the opposite direction, the second cursor 1215 may be projected onto the image 805 of the first viewer 1203 when the true cursor 1212 is positioned on the image 918 of the viewer 1206.

Another variation is also evident in the display of subject imagery. As described above, candidate control points become control points after their quality is measured in some manner. The illustrated embodiment uses a correlation threshold value that the user specifies. This threshold value can be changed dynamically by the user by manipulating a slide bar (not shown) in the user interface. The user can also watch the mesh change as a slider is moves up and down. This affords the user an additional level of detail, although at the expense of automation.

Other variations may also become apparent to those skilled in the art having the benefit of this disclosure. For instance, the Third Stage processing depicted in FIG. 4C and FIG. 11D is disclosed to be performed for each candidate control point serially. That is, a candidate control point is retrieved (at 1133, FIG. 11D) and each of the subsequent acts if performed before the next candidate control point is retrieved. In some alternative embodiments, some of the acts in Stage Three may be performed in a non-serial fashion. For instance, each candidate control point might undergo LIE (at 640, FIG. 11D) all at once prior to testing the surviving candidates against the threshold (at 1139). Similarly, the surviving candidates might all undergo threshold testing (at 640, FIG. 11D) prior to region (at 450, FIG. 11D) and transformation (at 460, FIG. 11D) recomputations.

These kinds of variations may result in better processing efficiency by winnowing out candidates somewhat earlier. This means less processing time and less cost. However, they also will result in less accuracy. The balance between efficiency and accuracy that any given implementation seeks to achieve will be specific to that particular implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method for use in registering a first image to a second image, comprising:
   generating a base transform between the first and second images from a plurality of base control points identified therein;
   generating a plurality of actual control points identified in both the first and second images; and
   generating a plurality of meshed regions from the base control points and the actual control points from which the first image may be mapped to the second image.

2. The computer-implemented method of claim 1, wherein generating the base transform between the first and second image, includes:
   identifying the base control points;
   iteratively refining the identified base control points; and
   determining the base transform from the iteratively refined base control points.

3. The computer implemented method of claim 1, wherein generating the generating actual control points includes:

generating a plurality of candidate control points;
culling low quality candidate control points; and
identifying unculled control points as actual control points.

4. The computer-implemented method of claim 1, wherein generating the meshed regions includes, for each actual control point, in series, iteratively:
recomputing regions previously computed from the base control points and the previous actual control points; and
recomputing the transformations for each of the recomputed regions when the regions are recomputed.

5. A computer-implemented method for generating a base transform for use in registering a first image to a second image, comprising:
identifying a plurality of base control points in the first and second images;
iteratively refining the identified base control points, including iteratively applying a multi-resolution area correlation routine to the pixels surrounding the identified base control points; and
determining the base transform from the iteratively refined base control points.

6. A computer-implemented method for use in registering a first image to a second image, comprising:
sampling a plurality of man-made features in the first and second images;
sampling a plurality of elevation locations;
generating a set of control points from the sampled man-made features from which a transform can be generated; and
culling low quality control points from the set, including excluding those yielding low information.

7. The computer-implemented method of claim 6, wherein culling the low quality control points includes testing the control points against a threshold.

8. A computer-implemented method for use in registering a first image to a second image, comprising:
generating a set of control points, including:
sampling a plurality of man-made features in the first and second images; and
sampling a plurality of elevation locations; and
culling the generated control points to remove those of low quality, wherein the culling includes:
testing the control points against a threshold; and
excluding those yielding low information.

9. A computer-implemented method for use in registering a first image to a second image comprising:
selecting a set of control points from non-image information layered onto the imagery;
generating a transform between the images from the control points;
sampling a plurality of man-made features in the first and second images; and
generating additional control points from the sampled man-made features.

10. The computer-implemented method of claim 9, wherein selecting the control points from non-image information includes sampling a plurality of elevation locations.

11. A computer-implemented method for use in generating a plurality of meshed regions from a Plurality of base control points and a plurality of actual control points from which a first image may be mapped to a second image, comprising, iteratively:
recomputing for each actual control point a plurality of-regions previously computed from the base control points and the previous actual control points; and
recomputing the transformations for each of the recomputed regions when the regions are recomputed; and
generating a base transform between the first and second image.

12. The computer implemented method of claim 11, further comprising generating a plurality of candidate control points from the first and second images.

* * * * *